United States Patent [19]

Thoma et al.

[11] Patent Number: 5,195,933

[45] Date of Patent: Mar. 23, 1993

[54] FRICTION DRIVE TRANSMISSION

[75] Inventors: Christian H. Thoma, St. Clement; George D. M. Arnold, St. Helier, both of Channel Islands

[73] Assignee: Unipat AG, Glarus, Switzerland

[21] Appl. No.: 802,252

[22] Filed: Dec. 9, 1991

[30] Foreign Application Priority Data

Dec. 7, 1990 [GB] United Kingdom ............... 9026651

[51] Int. Cl.[5] ........................ F16H 15/10; F16H 37/08
[52] U.S. Cl. ................................................. 475/206; 74/606 R; 192/4 C; 475/214
[58] Field of Search ............ 74/194, 196, 197, 606 R; 192/4 C; 475/206, 214

[56] References Cited

U.S. PATENT DOCUMENTS

| | | | |
|---|---|---|---|
| 661,409 | 11/1900 | Lewis | 475/206 X |
| 1,125,132 | 1/1915 | Lambert | 74/194 |
| 2,719,617 | 10/1955 | Stoltz | 192/4 C X |
| 2,808,738 | 10/1957 | Bartell | 475/206 X |
| 4,726,256 | 2/1988 | von Kaler et al. | 74/689 |

FOREIGN PATENT DOCUMENTS

| | | |
|---|---|---|
| 289285 | 4/1928 | United Kingdom . |
| 721186 | 12/1954 | United Kingdom . |
| 993271 | 5/1965 | United Kingdom . |
| 998223 | 7/1965 | United Kingdom . |

*Primary Examiner*—Allan D. Herrmann
*Attorney, Agent, or Firm*—Young & Thompson

[57] ABSTRACT

A friction drive unit for use within a transaxle driving assembly in self-propelled vehicles such as grass-mowing lawn tractors, the transaxle comprising a two-piece housing structure forming a number of internal chambers for the encapsulation of the friction drive unit, associated reduction gearing and a mechanical differential. The friction drive may comprise as input members, a pair of driver wheels operatable against a larger driven disc wheel acting as the output member, such that only one driver wheel can be engaged to the driven wheel at any one time, and where the direction of vehicle motion depends on which one of the two driver wheels is in contact with the driven wheel. Each of the driver wheels is subjected to continuous rotation from an input drive shaft and are operatively displaced along the shaft by means of respective sliding yoke means. The output from the driven wheel is connected to the transaxle output shafts by means of high ratio gear reduction means.

40 Claims, 6 Drawing Sheets

FRICTION DRIVE TRANSMISSION

The field of the invention relates to an improved friction drive transmission to allow effective use in association for example, with transaxle driving apparatus for grass-mowing vehicles such as ride-on tractors and walk-behind mowers, and where in particular it is an advantage to manufacture the friction drive transmission and transaxle as one unitary item.

What is needed is a variable speed transaxle driving apparatus employing a friction drive transmission with simple control means for clutchless operation in the selection for infinitely variable forward and reverse motion of the vehicle. Therefore the friction drive transmission according to the invention allows the operator driving such vehicles to the change speed of the vehicle without disrupting the drive-line between the engine and the wheels as is usual with conventional clutch-operated mechanical-shift geared transmissions.

In such conventional transmissions of the mechanical-shift type, there are provided typically, several forward and at least one reverse speed-changing gear sets as well as a neutral point. Further, such vehicles are usually equipped with a brake pedal, a clutch pedal and shifting mechanisms which require the clutch to be depressed before any change in gear ratio speed or direction of vehicle motion can be undertaken. In some instances, double de-clutching or complete stopping of the vehicle is necessary before such shifting of the gears can be undertaken. Naturally the quality of the driver's gear selection can significantly affect the performance of the vehicle. If such vehicles are operated on a hill or slope, the necessity of clutch depression can result in the vehicle rolling down the slope unexpectedly, especially if the brake to clutch connection has become worn or is incorrected adjusted. At a minimum, a substantial level of coordination is required to operate vehicles using conventional clutch and gear shift transmissions.

As an improvement to conventional clutch gear shifting transmissions, various types of variable speed transmissions have been developed which provide operation through a conveniently located single lever which merely needs to be pushed one way to move the vehicle in the forward direction, or pulled the other way to reverse the direction of vehicle motion. The further the lever is moved, the faster the vehicle travels and vice versa. One form of variable speed transmission now known in the field is a fluid drive as shown in U.S. Pat. No. 4,979,583. Such hydrostatic transmissions are however as yet too costly to include in some vehicle applications.

In the past, friction drive transmissions have been used successfully in industrial applications, but up to now they have not found wide acceptance in vehicle applications due to their tendency to slip under high loading, for instance, when a fully loaded vehicle is operated on a steep incline. Typical friction drives in the past have employed a single traction driver wheel that engages against a driven disk wheel for power transmission, and where the driver wheel is moved radially across the centre of rotation of the drive disk to vary the driven speed and/or the driven direction. Alternatively, a reverse gear could be used behind the friction drive in order that the direction of rotation of the output shaft can be reversed, but this is costly to include. Therefore, from another aspect of the invention, a second driver wheel is incorporated in the friction drive which only become active for power transmission when the first driver wheel is no longer engaged to the driven disc wheel.

Accordingly, the need is apparent for an improved friction drive transmission for use in transaxles that will allow easy speed variation in forward and reverse without the use of a clutch, provide a precise neutral point and safety brake, and yet be simple in construction and inexpensive to manufacture. It is also desirable that the device should be able to accommodate a vertical input drive shaft which is becoming a common requirement for lawn tractors, lawn mowers and other such small vehicles where typically, the engine is fitted with a vertical drive shaft.

The housing of the transaxle should provide an internal compartment for the friction drive, and a separate internal compartment for speed reducing means and differential. This is important as it has been found that the ideal fluid for the efficient operation of the friction drive is not compatible with the type of fluid required to lubricate the speed reducing means and differential.

The friction drive described in this invention is preferably driven at high rotational speeds typically 4000 rev/min, and where the typical step-down in reduction gearing between the friction drive and wheel axle is of the order of 25:1. As a result, the friction drive needs only to transmit relatively small amount of torque. Therefore by positioning the friction drive transmission at the least loaded end in the drive-line, the typical problems experienced with prior friction devices are overcome, such that the friction drive of present invention requires minimal maintenance and yet can provide efficient and reliable operation through-out its service life.

Preferably the ideal form of speed reducing means employed with the friction drive for use in transaxle driving apparatus should be of the type described in patent application PCT/GB91/01194. However, other types of speed reducing means such as the well known epicyclic gearing or conventional spur gearing may also be used.

These and other objects of the invention will become more apparent in the detailed description and examples that follows.

BRIEF DESCRIPTION OF THE DRAWINGS

The above mentioned and other features and objects of the invention, and the manner of attaining them, may be performed in various ways and will now be described by way of examples with reference to the accompanying drawings, in which.

DESCRIPTION

Although the friction-drive transmission according to the invention can be used with good effect in a variety of applications such as self-propelled lawn mowing machinery, only one particular application will be described.

Figure 1:
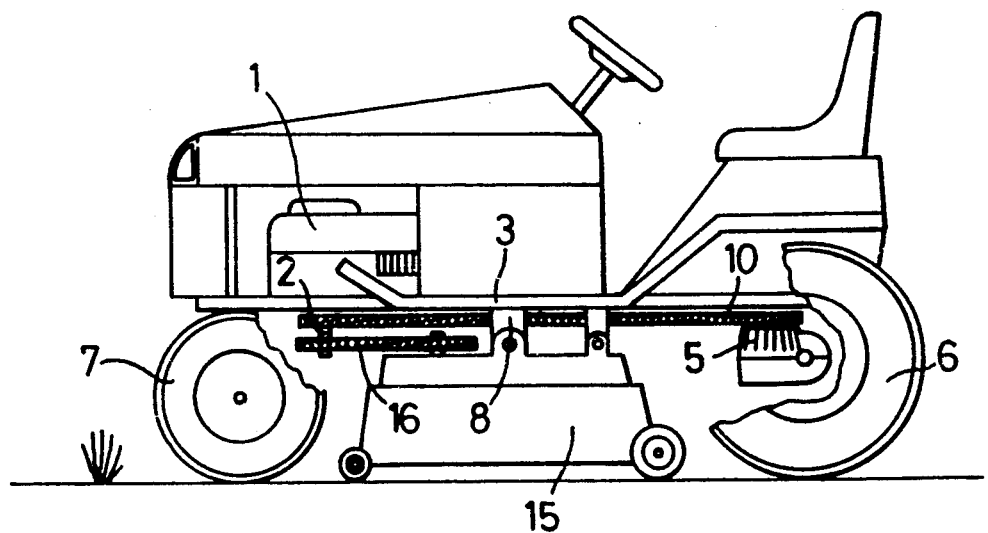
FIG. 1 is a side view of a typical grass cutting lawn tractor vehicle.
Figure 2:
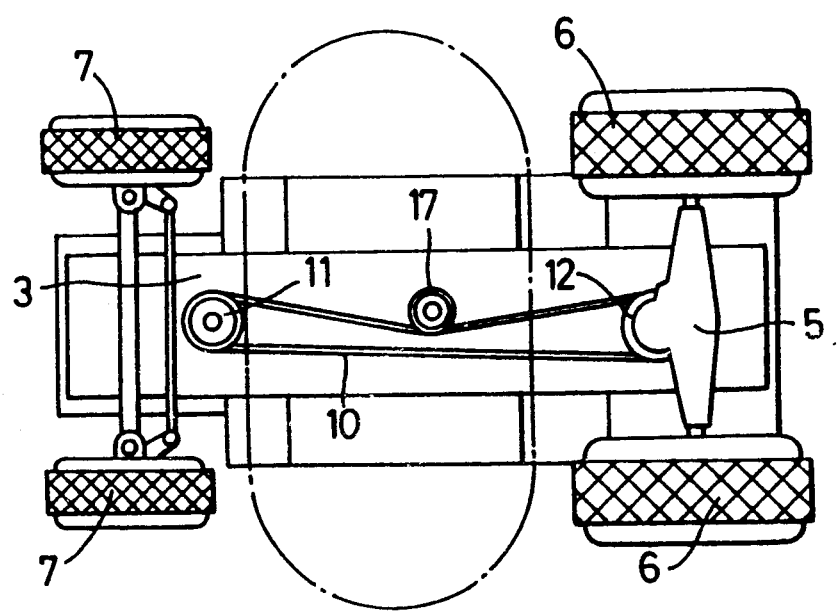
FIG. 2 is an underneath view of the vehicle in FIG. 1.

The lawn tractor vehicle as illustrated in FIGS. 1 and 2 comprises a vertically installed internal combustion engine 1 with the crank-shaft 2 pointing down to the ground. The engine 1 is shown mounted at the front end of the tractor chassis 3, and the transaxle 5 containing the friction drive is mounted towards the rear of the tractor chassis and engaged to the rear drive wheels 6. A Vee belt 10 operating in the horizontal plane connects the engine pulley 11 with the input drive pulley of the transaxle 5, with a simple jockey pulley 17 acting as tensioning means for the Vee belt as shown in FIG. 2.

In FIG. 1, a grass mower deck 15 is shown located beneath the vehicle chassis 3 in a position between the rear two drive wheels 6 and the front two steering wheels 7 of the tractor. The mower deck 15 is attached to the tractor chassis 3 by way of height-adjusting supports and is driven from the engine 1 by means of a short Vee belt 16.

Figure 3:
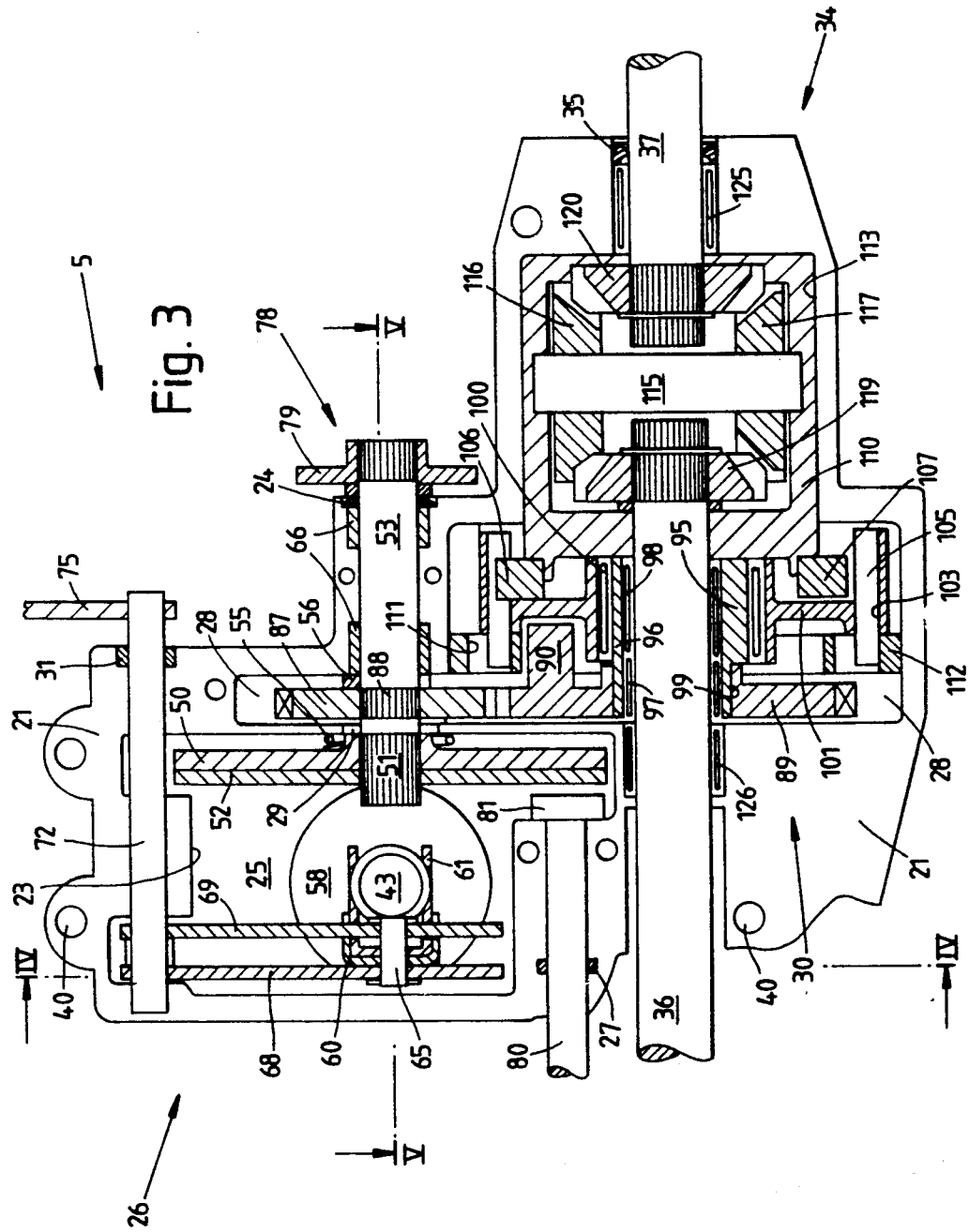
FIG. 3 is a part sectioned plan view of a variable speed mechanical transaxle employing a friction drive transmission according to the invention, where one housing element has been removed in order to show the internal components.
Figure 4:
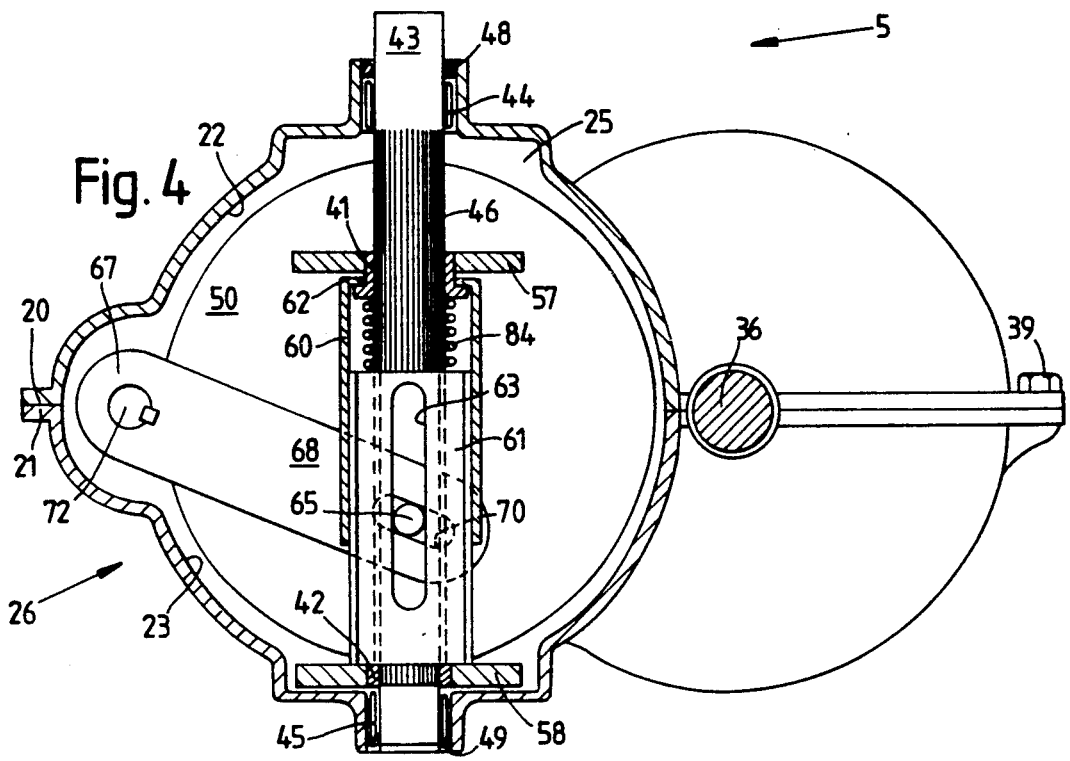
FIG. 4 is a part sectioned side view of FIG. 3 taken on line IV—IV, showing detains of the friction drive unit.
Figure 5:
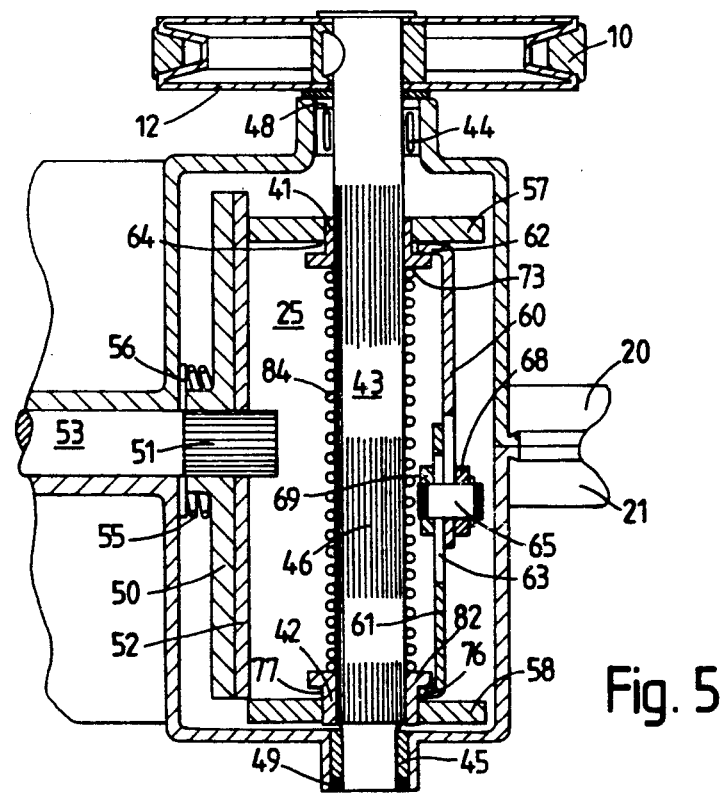
FIG. 5 is a part sectioned end view of FIG. 3 on line V—V.

The friction drive 26 illustrated in FIGS. 3 to 5 is integrated into a transaxle assembly 5 formed from at least two housing elements 20, 21. Each housing elements 20, 21 is provided with a number of pockets such as those shown as pockets 22, 23 in FIG. 4, such that when elements 20, 21 are attached together, pockets such as 22, 23 combine to form an internal chamber, and where preferably, the friction drive unit 26 is contained within a chamber 25, whereas both speed reducing means 30 and mechanical differential unit 34 are contained within a chamber 28.

Preferably the housing elements 20, 21 are separable on the parting plane along the longitudinal axes of the half shafts 36, 37 of the transaxle 5.

Before the two housing elements are attached together, sealing means such as liquid gasket is applied between the abutting surfaces of the two housing elements 20, 21. Also, shaft seals 24, 27, 31, and 35 are provided in order to prevent the fluids escaping from their respective chambers 25, 28.

The two housing elements 20, 21 are attached together by a plurality of screws 39 which are inserted and engaged into threaded holes 40. When screws 39 are tightened down, the housing elements 20, 21 form a stiff housing structure which is attached to the chassis 3 of the vehicle.

It is a prefered feature of the invention that the friction drive unit 26 located in chamber 25 should be kept segregated from chamber 28 containing speed reducing means 30 and differential 34. This is achieved by incorporating a shaft seal 29 which thereby prevents traction fluid contained within chamber 25 from entering chamber 28. This is important as it has been found that certain types of traction fluids which exhibit the ideal properties for the efficient operation of the friction drive unit are not suitable for the efficient operation of either the speed reducing means 30 or the differential 34.

The transaxle 5 as illustrated has a vertical input drive shaft 43 rotatably supported in the housing by means of bearings 44, 45 disposed in each housing element 20, 21 respectively.

The protruding end of shaft 43 is fitted with a pulley 12 on which the vee belt 10 operates in transmitting power from the prime mover 1 to the transaxle 5, and fluid seals 48, 49 are provided to prevent the escape of fluid from chamber 25.

That portion of shaft 43 which lies between bearings 44, 45 is provided with splines 46 or other similar driving means, which engage with sleeves 41, 42 onto which are fixed respective driver wheels 57, 58. Driver wheels 57, 58 act as the input transmission members for the friction drive unit 26.

Driven wheel 50 acts as the output transmission member of the friction drive unit 26, and is fixedly splined 51 to shaft 53, with suitable means such as a spring 55 acting to urge driven wheel 50 against whichever of the two driver wheels 57, 58 it is in contact with, thereby increasing the adhesion between the wheels for efficient power transmission.

Furthermore, driven wheel 50 may also be lined with friction material 52 in order to provide enhanced traction between it and the driver wheels 57, 58.

The sleeves 41, 42 of each respective driver wheels 57, 58 remain permanently engaged to splines 46 and therefore driven at the same speed as shaft 43.

Yoke means 60, 61 are mounted back-to-back to overlap in sliding relative engagement with each other along the rotating axis of the input shaft 43. Yoke means 61 is provided with a turned-in end portion 76 which engages groove 77 formed between sleeve 42 and driver wheel 58. Similarly, yoke means 60 is provided with a turned-in end portion 62 with engages groove 64 formed between sleeve 41 and driver wheel 57.

A spring 84 is positioned over shaft 43 and acts against the end face 73, 82 of respective driver wheels 57, 58 in order to keep driver wheels 57, 58 spaced apart such that the non-active driver wheel is kept out of engagement with driven wheel 50 during the period when the active driver wheel is in contact with driven wheel 50. Also when the operator desires that the vehicle should be stationary, spring 84 keeps both driver wheels 57, 58 out of contact with driver wheel 50.

In order to help the understanding of the friction drive unit 26, the frontal face of yoke means 60 has been removed in FIG. 4. Each of the yoke means 60, 61 is provided with a slot 63, and where slots 63 are positioned to be coaxial with the axis of shaft 43. A pin 65 passes through the slots 63 in both yoke means 60, 61 and is retained in place by circlips (not shown) such that the pin 65 is free to move along slots.

When the pin 65 is in contact with the end of slot 63 in either yoke means 60 or 61, it displaces that particular yoke means with the result that the respective driver wheel to which it is fixed becomes axially displaced. For instance as shown in FIG. 5, pin 65 is in contact with the end of the slot 63 in yoke means 60, and therefore yoke means 60 is pushed along the axis of shaft 43 such that turned-in portion 62 moves sleeve 41 and hence driver wheel 57 into contact with driven wheel 50. At the same time, spring 84 keeps sleeve 42 and hence driver wheel 58 out of engagement with driven wheel 50.

Similarly, when the action is reversed, pin 65 acting against the end of slot 63 in yoke means 61, pushes yoke means 61 along the axis of rotation of shaft 43 such that turned-in portion 76 moves sleeve 42 and hence driver wheel 58 into contact with driven wheel 50, while spring 84 keeps sleeve 41 and hence driver wheel 57 out of engagement with driven wheel 50.

The merit of such yoke means is that as each can only engage with its respective driver wheel, that only one driver wheel can be displaced to contact the driven wheel at any one time.

A control shaft 72 is supported between housing elements 20, 21 and has one end extended to protrude through the housing to connect with a speed selection lever 75. The other end of control shaft 72 is connected to an arm 67 comprising bifurcated members 68, 69. Bifurcated members 68, 69 are used to control yoke means 60, 61, and this achieved by providing slots 70 in each of the bifurcated members 68, 69. Slots 70 are arranged to be approximately perpendicular with those slots 63 formed in the yoke means 60, 61.

Therefore pin 65 not only passes through slots 63 in yoke means 60, 61 but also slots 70 in the bifurcated members 68, 69 so that pin 65 can move in both slots 60 and 70 without difficulty.

When control shaft 72 is partially rotated, bifurcated members 68, 69 of control arm 67 are caused to move in an arc such that pin 65 moves along slot 70 as its direction of movement is limited due to being guided in slots 63 in yoke means 60, 61.

As a result of this pin 65 movement and depending on which way control shaft 72 is rotated, when pin 65 reaches engagement with the end of slots 63 in yoke means 60 or 61, one of the yoke means 60 or 61 is displaced along the axis of shaft 43 so that one of the two driver wheels 57, 58 comes into contact with the driven wheel 50.

Shaft 53 is rotatably supported in the housing by means of bearings 66, and splines 88 are provided onto which is fixed pinion gear 87. Pinion gear 87 meshes with larger gear 89 which is fixed to hollow shaft 96 and supported by bearings 97, 98 on half shaft 36. Gear 89 is ideally manufactured as a powder metal component and is preferably provided with integral balance weight 90 in order to compensate for any out of balance loads present in one particular type of speed reducing means 30 described below.

In order for the friction drive unit 26 to operated effectively and efficiently, for best advantage it should be operated at high rotational speed, and ideally above that of the prime mover 1. As a result, a large ratio speed reduction is required between the output of the friction drive unit 26 and the drive wheels 6 of the vehicle in order that the friction drive unit 26 needs only to transmit relatively modest levels of torque, f.i. under 10 lbs-ft.

There are various types of speed reducers that can be used with good effect such as the well known art of epicyclic gearing. However spur gear trains may also be usefully employed as will be described in a later embodiment, but the preferred form of speed reducer belongs to the hypocycloidal family that have become well renowned for their capacity in providing efficient high ratio speed reduction in a single step.

Therefore for simplification, the speed reducing means 30 should be positioned next to mechanical differential 34 within chamber 28, and in one form comprises an eccentric member 95 which is formed integral with hollow shaft 96. Hollow shaft 96 is supported on half shaft 36 by means of bearings 97, 98, and is extended at one for splined 99 engagement with gear 89.

The eccentric 95 carries bearing 100 in order to support carrier 101 which is generally ring like in shape. Carrier 101 is provided with a number equally spaced openings 103, each opening 103 receiving and supporting a pin 105.

Pins 105 are extended at one end through openings 103 in the carrier 101 to engage with apertures 111 provided in a static plate 112 which is fixed to the housing interior of the transaxle 5.

Teeth 106 are provided on male gear sprocket 107 which is fixed to the cage assembly 110 of the differential 34, and where it has been arranged by design that there is a difference of at least one between the number of pins 105 and the number of teeth 106.

During one full rotation of the eccentric 95, the carrier 101 is caused to gyrate about eccentric 95 as the extended ends of pins 105 acting in their respective apertures 111 serve to constrain movement of carrier 101 to a define path. Therefore, as pins 105 move into and out of sequential engagement with teeth 106 in gear sprocket 107, the resultant reaction against teeth 106 and cage assembly 110 is such that they are indexed or displaced equivalent to one tooth spacing.

The cage assembly 110 of differential 34 is provided with a central shaft 115 on which bevel gears 116, 117 are mounted and which mesh with bevel gears 119, 120 that are non-rotatably connected to respective ones of output half shafts 36, 37.

The outer diameter of cage assembly 110 is used to provide further bearing support for the speed reducing means 30, and it is therefore supported within a journal bearing 113 formed directly in this example, from material of the housing elements 20, 21.

Bevel gears 116, 117, 119, 120 of differential 34 acts to transmit rotation of the cage assembly 110 to the axle half shafts 36, 37 and the rear drive wheels 6 of the vehicle as known to those skilled in the art. The inclusion of the differential is important as it allows normal differentiation between the left and right drive wheels of the vehicle and helps prevent lawn damage especially when tight turns are undertaken.

Each half shafts 36, 37 has preferably, an outer bearing 125 and fluid seal 35, and where half shaft 36 is provided with an extra bearing 126 positioned adjacent to the speed reducing means 30.

However, some low duty applications, outer bearings 125 may be dispensed with and half shafts 36, 57 supported directly between housing elements 20, 21.

In order to provide a parking brake for the vehicle, shaft 53 may be extended at one end so as to protrude out from the transaxle 5 assembly to connect with a brake assembly 78. Brake assembly 78 being of a conventional type employing a disc 79 which is engaged to shaft 53 such that when held by calipers (not shown), shaft 53 is prevented from rotating.

However, an alternative or secondary brake may be fitted, and this is shown as push rod 80 in FIG. 3. Rod 80 being supported between the housing elements 20, 21, and when displaced along it axis into chamber 25 by the vehicle operator, its mushroom head 81 engages with wheel 50 and holds wheel 50 stationary, thus providing a simple parking brake for the vehicle. Furthermore, when driver wheels 57, 58 are not in engagement with driven wheel 50, spring 55 moves driven wheel 50 against mushroom head 81 and this prevents any tendency for driven wheel 50 to rotate, thus providing a simple and cost-effective automatic brake effective only when the friction drive is set to the neutral position. Also, if the operator wishes to move the vehicle without engaging the engine, this may be simply achieved by pulling rod 80 and thereby releasing mushroom head 81 from engagement with driven wheel 50.

The operation of a vehicle incorporating a friction drive unit 26 within a transaxle 5 is as follows. When the prime mover 1 is operated, it transmits power to the input shaft 43 of the transaxle 5 by means of a belt 10 drive. If the pulley diameter 11 fitted to shaft 2 of the prime mover is larger than the size of pulley 12 fitted to input shaft 43, input shaft 43 will rotate at a higher rotational speed than shaft 2 of the prime mover 1.

Rotation of shaft 43 causes rotation of driver wheels 57, 58, but when driver wheels 57, 58 are out of contact with driven wheel 50, there is no resultant drive through the transaxle 5.

However, as soon as the vehicle operator moves lever 75, partial rotation of the control shaft 72 causes movement of the end of the control arm 67 and associated bifurcated members 68, 69 from the neutral or central position. The slots 70 in the bifurcated members 68, 69 of arm 67 accommodates the variation in radius from the control shaft 72.

Therefore pin 65 can slide along slot 63 in one yoke means, for instance 61 as shown in FIG. 4 without reaching the end of slot 63 such that driver wheel 58 remains inactive as pin 65 can never reach the end of slot 63 in yoke means 61 where it would start to displace driver wheel 58. During this period, spring 84 operating against the inner end face 73, 82 of respective sleeve 41, 42 ensures that driver wheel 58 remains out of contact with driven wheel 50. Therefore driver wheel 58 will remain inactive until the operator moves the control lever 75 so to reverse the direction of motion of the vehicle.

However, by contrast, the pin 65 does engage with the end of slot 63 in yoke means 60 and here driver wheel 57 is drawn into contact with the driven wheel 50 at the point of largest diameter as shown in FIG. 5, and thereby the output speed in forward vehicle motion increases as the driver wheel 57 moves towards the centre of the driven wheel 50.

This particular friction drive unit 26 has an operational advantage in that initial power transmission occurs between the driver wheel to the driven wheel at the maximum diameter of the driven wheel. As a result, this friction drive unit 26 becomes most effective in terms of mechanical advantage during periods when most output torque is demanded from the transaxle to propel the vehicle, ie. the commencement of vehicle motion.

The thrust loading imposed on driven wheel 50 is taken by thrust bearing 56, and rotation of shaft is transmitted through gears 87 and 89, to turn hollow shaft 96 and eccentric 95 of the speed reducing means 30.

Gyration of carrier 101 causes pins 105 to become sequentially engaged with each of the teeth 106, such that the gear sprocket 107 and cage assembly 110 of differential 34 rotate at reduced speed, and rotation passes through bevel gear 116, 117, 119, 120 to half shafts 36 and respective drive wheels 6 of the vehicle.

To reverse direction of the vehicle, the operator moves lever 75 in the opposite direction, and this produces partial rotation of the control shaft 72 causing movement of the end of the control arm 67. However in this case, pin 65 engages with the end of slot 63 in yoke means 61 and therefore in this case, driver wheel 58 is drawn into contact with the driven wheel 50.

Finally, when the operator moves lever 75 to the neutral position, driver wheels 57, 58 are now no-longer engaged to driven wheel 50, and as a result, no power is transmitted through the transaxle and the vehicle is at rest. The operator may then engage calipers onto disc 79 of brake assembly 78 and the vehicle is parked. Alternatively, the operator may push rod 80 so that mushroom head 81 engages with driven wheel 50 to hold it stationary, or alternatively, spring 55 may push out driven wheel 50 against the mushroom head 81 to prevent further rotation.

Figure 6:
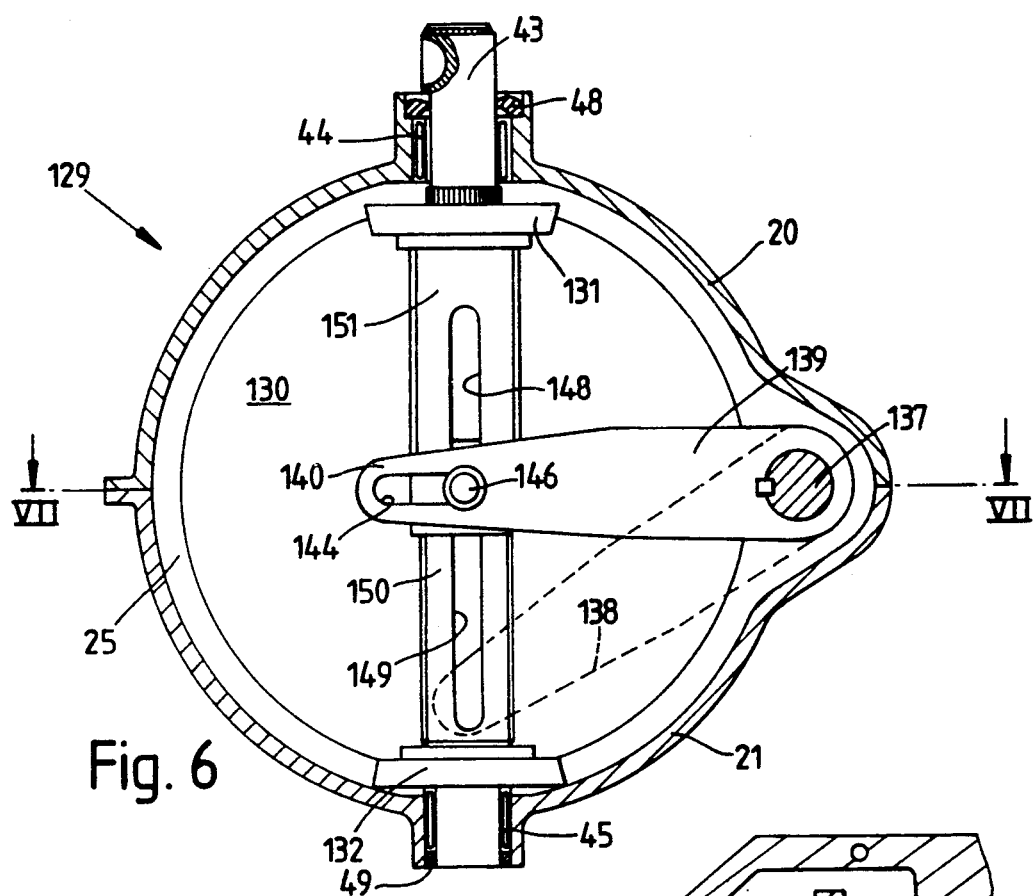
FIG. 6 is a part sectioned side view of an alternative friction drive unit for use in a transaxle.
Figure 7:
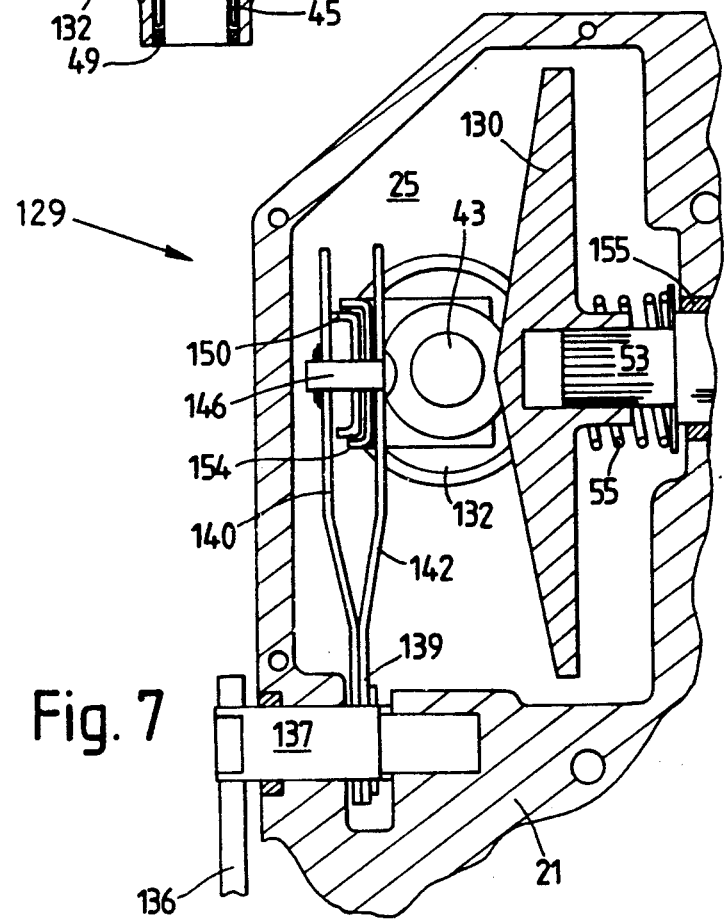
FIG. 7 is a part sectioned view on line VII—VII of FIg. 6.

FIGS. 6 & 7 illustrates an alternative embodiment of a friction drive unit 129, and it differs in one main respect from the friction drive unit previously a described in that in this case the face profiles of driven wheel 130 and driver wheels 131, 132 are provided with a slight angle.

The advantage of including such an angled profile is that it provides an automatic bias to the driver wheels 131, 132 such that the non-active driver wheel has the tendency to run off the angled surface of driven wheel 130, and thereby remains withdraw from contact with the driven wheel. The particular driver wheel remains out of contact with the driven wheel until the operator purposely re-engages it by way of moving control lever to displace yoke means associated with this particular driver wheel.

Although the controller for the friction drive unit 129 is constructed in a different manner to that described as the first embodiment, it operates on the same principle.

Operating lever 136 is connected to control shaft 137 which is engaged to control arm 139 leading two bifurcated portions 140, 142. FIG. 6 shows the friction drive unit 129 in the neutral position, such that driver wheels 131, 132 are out of contact with driven wheel 130.

Bifurcated portion 140 is provided with a slot 144 into which pin 146 passes through. Pin 146 extends through slot to engage with a further slot 148 provided in yoke means 151, and where yoke means 151 in connected to apply displacement to driver wheel 131 in a like manner to that described in the first embodiment.

Similarly, bifurcated portion 142 is also provided with a slot 144 (not visible) into which the same pin 146 passes through. Pin 146 extends through slot 146 to engage with a further slot 149 provided in yoke means 150, and where yoke means 150 in connected to apply displacement to driver wheel 132 in a like manner to that described in the first embodiment.

Yoke means 150, 151 operate in same manner as already described in the first embodiment.

When the operator moves lever 136 from neutral to the full forward position, partial rotation of control shaft 137 results in bifurcated ends 140, 142 moving to a position as shown by dotted line 138.

Pin 146 travels along slot 144 (in order to accommodate the variation in the radius from the control shaft 137) and acting on the end of slot 148 causes yoke means 151 to be drawn down, and by this action driver wheel 131 engages with driven wheel 130 to transmission rotation from input shaft 43 to output shaft 53. As driver wheel 131 is moved closer to the centre of driven wheel 130, the rotational speed of output shaft 53 is increased in proportion.

When the operator moves lever 136 from neutral to the reverse position, pin 146 travels along slot 144 and acts at the end of slot 149 in yoke means 150 causing yoke means 150 to be drawn up, by this action driver wheel 132 to engages with driven wheel 130 for power transmission.

Figure 8:
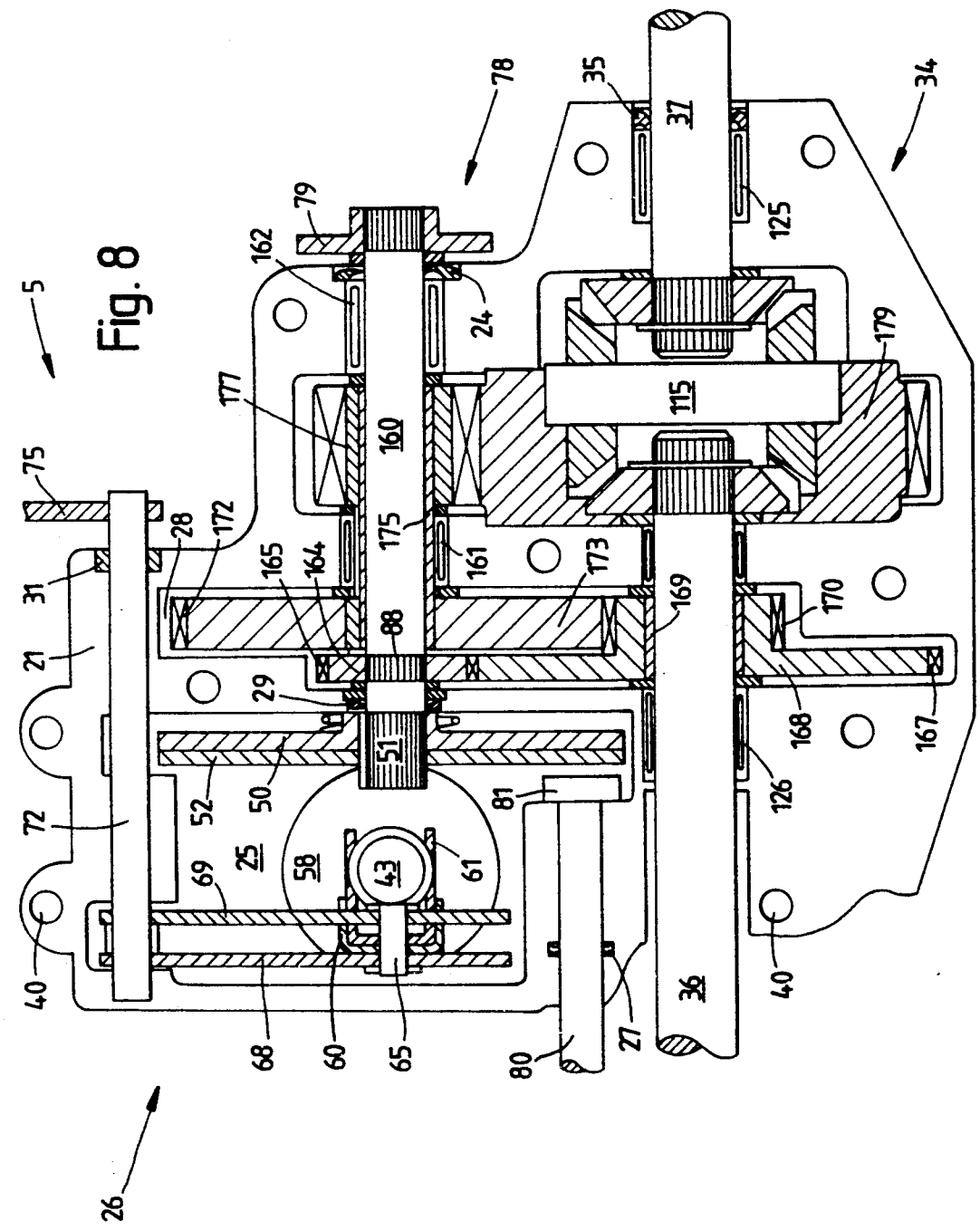
FIG. 8 is a part sectioned plan view of a further embodiment of a variable speed transaxle employing a friction drive transmission, where one housing element has been removed in order to show the internal components.

In the transaxle of FIG. 8, an alternative form of speed reducing means employing three sets of spur gear is used for connecting the output member of the friction drive unit to the mechanical differential.

As the friction drive unit is identical to that already described as the first embodiment, only those features in the transaxle that are not common will be described in detail.

Shaft 160 is rotatably supported in the housing by bearing 161, 162, and where one end of shaft 160 is fixed by splines 51 to the driven wheel 50 located within chamber 25.

A pinion gear 164 splined 88 to shaft 160 in chamber 28, the teeth 165 of which mesh with one set of teeth 167 provided on cluster gear 168, and where cluster gear 168 is supported for rotation on half shaft 36 by bearing 169.

A second set of teeth 170 on cluster gear 168 mesh with teeth 172 of intermediary gear 173 which is fixed to a sleeve 175. Sleeve 175 rotates on shaft 160 and extends past bearing 161 to fixedly engage to final drive pinion gear 177, and where final pinion 177 meshes with ring gear 179 formed as part of the cage assembly of the differential 34.

In operation, rotation of driven wheel 50 of the friction drive 26 is transmitted through gears 164, 168, 173, 177 to ring gear 179 of differential 34 from where is passes to half-shafts 36, 37 in manner already described in the first embodiment.

Figure 9:
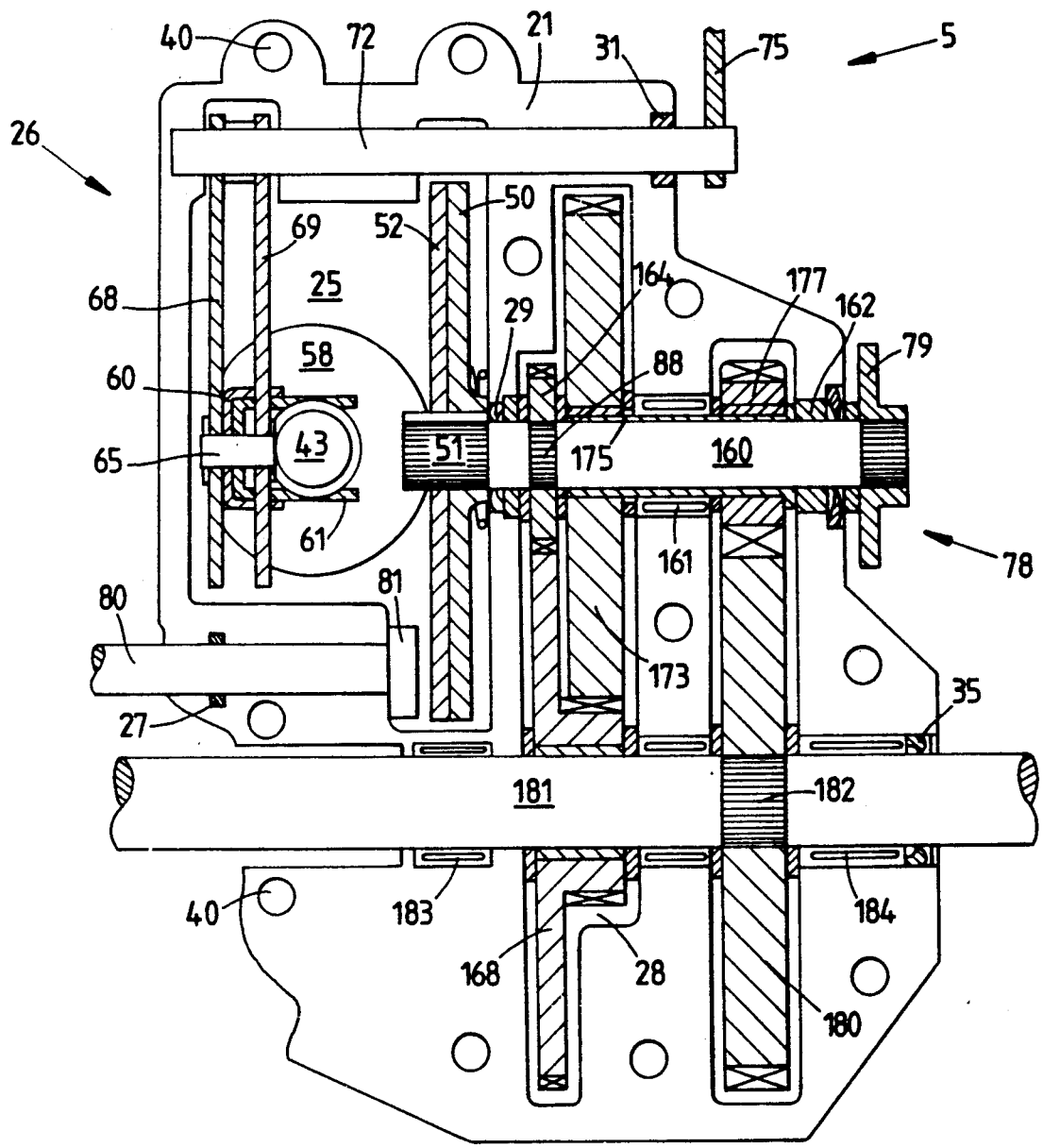
FIG. 9 is a part sectioned plan view of a still further embodiment of variable speed transaxle employing a friction drive transmission, where one housing element has been removed in order to show the internal components.

In the transaxle of FIG. 9 for a pedestrian walk-behind mower, three sets of spur gear are used to connect driven wheel 50 of the friction drive unit 26 to an output axle shaft 181, where no differential action between the drive wheels is required.

In this example, a final drive gear 180 is used in place of the ring gear 179 of the previous embodiment, and is fixed to an output axle shaft 181 by splines 182.

Axle output shaft 181 is supported by bearings 183, 184 and protrudes through the housing to support drive wheels 6.

Alternatively, final drive gear 180 may only be fixed to one output axle shaft to drive a single wheel, and where the other axle shaft supports a wheel which is allowed to free-wheel.

It is to be understood that while we have illustrated and described various embodiments for the invention, it is not to be limited to the specific form or arrangement of parts herein described and shown except insofar as such limitations are included in the claims.

What is claimed is:

1. A friction-drive transmission apparatus having a housing defining a chamber; said friction-drive transmission encapsulated in said chamber and comprising: first and second driver wheels; an input shaft rotatably mounted in said housing and axially immovable with respect to said housing, said input shaft drivingly engaging said driver wheels and means for moving said driver wheels along the axis of said input shaft; a driven wheel disposed in said chamber for engagement by said driver wheels; an output shaft rotatably mounted in said housing for drivingly engaging said driven wheel and means for selectively controlling said driver wheels for engaging said first driver wheel with said driven wheel to provide rotation of said output shaft in one sense and for separately engaging the said second driver wheel with said driven wheel to provide rotation of said output shaft in the other sense.

2. Apparatus according to claim 1 wherein the rotating axis of said output shaft is set perpendicular to the rotating axis of said input shaft.

3. Apparatus according to claim 1 wherein said driver wheels have axial sliding movement upon an externally splined portion of said input shaft.

4. Apparatus according to claim 1 wherein the said housing supports a plunger which can be engaged to said driven wheel to act as a brake.

5. Apparatus according to claim 1 wherein said driven wheel is of larger diameter than the said first and second driver wheels.

6. Apparatus according to claim 1 wherein said driven wheel is biased against the said first or second driver wheels by spring means.

7. Apparatus according to claim 1 wherein the said first and second elements of said yoke member are slidingly engaged to one another to allow relative movement.

8. Apparatus according to claim 1 wherein the said first and second driver wheels and said driven wheel have angled contact faces.

9. Apparatus according to claim 1 wherein the said yoke elements positions the respective said first and second driver wheels out of contact with the said driven wheel when said control shaft is set in a neutral position.

10. Apparatus according to claim 1 wherein a neutral point occurs when both said driver wheels are out of engagement with said driven wheel, and wherein spring means are provided in order to displace said driven wheel against a brake member to prevent rotation of said driven wheel.

11. Apparatus according to claim 1, wherein a pair of elongate slots are provided in respective said yoke elements, and a pin passing through said slots engages with a further pair of slots provided in respective said arms.

12. Apparatus according to claim 11 where the said slots disposed within said arms are generally set perpendicular to those said slots disposed in the said yoke elements.

13. Apparatus according to claim 1 wherein one said yoke element is operated by its respective said arm when the said speed control shaft is rotated one way, whereas the other said yoke element is operated by its respective said arm when the said speed control shaft is rotated the opposing way.

14. A friction-drive transmission apparatus having a housing defining a chamber, said housing being defined by at least two elements separable on a parting plane generally containing the longitudinal axis of an output shaft; an input shaft rotatably mounted in at least one said housing element and axially immovable with respect to said housing, said input shaft extending into said chamber for engagement with first and second driver wheels, and means for moving said driver wheels along the axis of said input shaft; a driven wheel disposed in said chamber and rotatably mounted on said output shaft, said driven wheel being drivingly engaged to either said first or second driver wheels for power transmission between said input shaft and said output shaft; and means for controlling said first and second driver wheels for selective engagement with said driven wheel, said first driver wheel operating against said driven wheel for 'forward' rotation of said output shaft, said second driver wheel operating against said driven wheel for 'reverse' rotation of said output shaft.

15. Apparatus according to claim 14 wherein said driver wheels have axial sliding movement upon an externally splined portion of said input shaft.

16. Apparatus according to claim 14 wherein said output shaft is rotatably supported between the said housing elements.

17. Apparatus according to claim 14 wherein the rotating axis of said input shaft is perpendicular to the rotating axis of said output shaft.

18. Apparatus according to claim 14 wherein axle shaft means are rotatably supported in said housing, said axle shaft means having an axis substantially coincident with said parting plane; the axis of rotation of said driver wheels being perpendicular to the axis of rotation of said driven wheel such that the rotating axis of said driven wheel is parallel to said parting plane and perpendicular to said primary shaft.

19. Apparatus according to claim 14 wherein axle shaft means are rotatably supported in said housing, said axle shaft means having an axis substantially coincident with said parting plane; the rotational axis of the said input shaft being perpendicular to the rotational axis of said axle shaft means.

20. An assembly comprising a housing including two main housing elements connected together along a parting plane and defining at first and second internal chambers; a friction-drive transmission encapsulated in said first chamber and having a primary shaft and a secondary shaft for power transmission; axle shaft means rotatably supported in said housing and having its axis substantially coincident with the said parting plane; and speed reducing means located within said second chamber and drivingly connected between said secondary shaft and said axle shaft means.

21. An assembly according to claim 20 wherein said first and second chambers are segregated from each other to prevent fluid contained in either one of said chambers from entering the other said chamber.

22. An assembly according to claim 20 wherein said speed reducing means includes a mechanical differential.

23. An assembly according to claim 20 wherein the rotation axis of said secondary shaft is set perpendicular to the rotating axis of said primary shaft.

24. An assembly according to claim 20 wherein the said friction-drive transmission includes two driver wheels selectively drivingly engaged to said primary shaft and a driven wheel drivingly engaged to said secondary shaft.

25. An assembly according to claim 24 wherein a substantial portion of said primary shaft within said first chamber is provided by driving means such as splines for the coupling of the two said driver wheels.

26. An assembly according to claim 20 wherein the said secondary shaft is rotatably supported between the said housing elements, said secondary shaft being extended to pass from the said housing to engage with one element of a mechanical brake assembly.

27. An assembly according to claim 20 wherein the said housing includes a partition wall separating the said first chamber from the said second chamber.

28. An assembly according to claim 24 wherein the said housing supports a plunger which can be engaged to said driven wheel to act as a brake.

29. An assembly according to claim 24 wherein the said driven wheel is of larger diameter than the two said driver wheels.

30. An assembly according to claim 24 wherein the said driven wheel is biased against the first or the second said driver wheels by spring means.

31. An assembly according to claim 24 wherein a yoke member is provided for position control of the said first and second driver wheels, said yoke member comprising two elements, said first element for operating said first driver wheel, said second element for operating said second driver wheel.

32. An assembly according to claim 31 wherein a speed control shaft is supported within said housing operatively connected to said first and second driver wheels via respective said elements of said yoke member.

33. An assembly according to claim 31 wherein the said first and second elements of said yoke member are slidingly engaged to one another to allow relative movement.

34. An assembly according to claim 31 wherein the said driver wheels initially engage on the outer periphery of said driven wheel and are movable by their said respective yoke elements towards the centre of said driven wheel.

35. An assembly according to claim 20 wherein the said driver wheels and said driven wheel have angled contact faces.

36. An assembly according to claim 31 wherein the said yoke elements positions respective said first and second driver wheels out of contact with said driven wheel when said control shaft is set in a neutral position.

37. An assembly according to claim 30 wherein the said spring means displaces said driven wheel against a plunger to prevent the rotation of said driven wheel.

38. An assembly comprising a housing defining an internal chamber in which a friction-drive transmission is located, said friction-drive transmission comprising first and second driver wheels and one driven wheel; a primary shaft rotatably mounted in said housing and axially immovable with respect to said housing, said primary shaft extending into said chamber for engagement with said first and second driver wheels, and means for moving said driver wheels along the axis of said primary shaft; a secondary shaft rotatably mounted in said housing and extending into said chamber for engagement with said driven wheel, said driven wheel drivingly engaged to either said first or second driver wheels for power transmission between said primary shaft and said secondary shaft; and means for controlling said first and second driver wheels for selective engagement with said driven wheel, said first driver wheel operating against said driven wheel for 'forward' rotation of said secondary shaft, said second driver wheel operating against said driven wheel for 'reverse' rotation of said secondary shaft; axle shaft means rotatably supported in said housing and wherein speed reducing means located within said chamber drivingly connects said secondary shaft to said axle shaft means.

39. An assembly according to claim 38 wherein said first and second driver wheels have axial sliding movement upon an externally splined portion of said primary shaft.

40. An assembly according to claim 38 wherein the rotating axis of said primary shaft is perpendicular to the rotating axis of said axle shaft means.

* * * * *